(12) United States Patent
Ting

(10) Patent No.: US 11,648,749 B2
(45) Date of Patent: May 16, 2023

(54) RIGID BOARD PLASTIC FLOORING AND ITS PRODUCTION METHOD

(71) Applicant: Darde Flooring Development (JiangSu) Co., Ltd., Nantong (CN)

(72) Inventor: Hsu-Ming Ting, Nantong (CN)

(73) Assignee: Danie Flooring Development (JiangSu) Co., Ltd., Nantong (CN)

( * ) Notice: Subject to any disclaimer, the term of this patent is extended or adjusted under 35 U.S.C. 154(b) by 0 days.

(21) Appl. No.: 17/208,192

(22) Filed: Mar. 22, 2021

(65) Prior Publication Data

US 2021/0206143 A1 Jul. 8, 2021

Related U.S. Application Data

(62) Division of application No. 16/423,311, filed on May 28, 2019, now abandoned, which is a division of
(Continued)

(30) Foreign Application Priority Data

Nov. 20, 2015 (CN) .......................... 201510809064.0

(51) Int. Cl.
 *B32B 5/00* (2006.01)
 *B32B 7/00* (2019.01)
(Continued)

(52) U.S. Cl.
 CPC .................. *B32B 7/04* (2013.01); *B32B 5/18* (2013.01); *B32B 7/12* (2013.01); *B32B 9/02* (2013.01); *B32B 27/06* (2013.01); *B32B 27/065* (2013.01); *B32B 27/08* (2013.01); *B32B 27/16* (2013.01); *B32B 27/18* (2013.01); *B32B 27/285* (2013.01); *B32B 27/288* (2013.01);
(Continued)

(58) Field of Classification Search
 CPC .... B32B 7/04; B32B 7/12; B32B 5/18; B32B 27/06; B32B 27/065; B32B 27/08; B32B 27/16; B32B 27/18; B32B 27/285; B32B 27/288; B32B 27/308; B32B 27/32; B32B 27/322; B32B 27/365; B32B 37/06; B32B 37/10; B32B 37/153; E04F 15/02038; E04F 15/105; E04F 15/107
 See application file for complete search history.

(56) References Cited

U.S. PATENT DOCUMENTS 4,678,528 A * 7/1987 Smith ................. B32B 38/0036
 156/235
8,448,400 B2 * 5/2013 Garcia .............. E04F 15/02033
 52/592.1

(Continued)

*Primary Examiner* — Linda L Gray
(74) *Attorney, Agent, or Firm* — Dinsmore & Shohl LLP

(57) ABSTRACT

Embodiments disclosed herein are directed to a method of producing a rigid board plastic flooring. The method includes extruding a bottom layer without adding a plasticizer, overlapping sequentially a back embossment board, the bottom layer, a first connecting layer, a decoration layer, and a wear layer to form a sandwich, hot pressing the sandwich with temperature and pressure and applying a UV treatment to a top surface of the sandwich after hot pressing the sandwich. The method continues by annealing the sandwich after applying the UV treatment, cooling the sandwich to ambient temperature, and cutting the sandwich to size.

3 Claims, 1 Drawing Sheet

Related U.S. Application Data application No. 15/013,461, filed on Feb. 2, 2016, now abandoned.

(51) Int. Cl.

| | | |
|---|---|---|
| B32B 9/00 | (2006.01) | |
| B32B 27/00 | (2006.01) | |
| B32B 37/00 | (2006.01) | |
| B32B 38/00 | (2006.01) | |
| E04F 15/00 | (2006.01) | |
| B32B 7/04 | (2019.01) | |
| B32B 7/12 | (2006.01) | |
| B32B 27/06 | (2006.01) | |
| B32B 27/08 | (2006.01) | |
| B32B 27/16 | (2006.01) | |
| B32B 27/18 | (2006.01) | |
| B32B 27/28 | (2006.01) | |
| B32B 27/30 | (2006.01) | |
| B32B 27/32 | (2006.01) | |
| B32B 27/36 | (2006.01) | |
| B32B 37/15 | (2006.01) | |
| E04F 15/10 | (2006.01) | |
| B32B 5/18 | (2006.01) | |
| B32B 9/02 | (2006.01) | |
| B32B 37/06 | (2006.01) | |
| B32B 37/10 | (2006.01) | |
| E04F 15/02 | (2006.01) | |
| B32B 37/12 | (2006.01) | |
| B32B 37/20 | (2006.01) | |

(52) U.S. Cl.
CPC .......... *B32B 27/302* (2013.01); *B32B 27/304* (2013.01); *B32B 27/308* (2013.01); *B32B 27/32* (2013.01); *B32B 27/322* (2013.01); *B32B 27/36* (2013.01); *B32B 27/365* (2013.01); *B32B 37/06* (2013.01); *B32B 37/10* (2013.01); *B32B 37/153* (2013.01); *E04F 15/02038* (2013.01); *E04F 15/105* (2013.01); *E04F 15/107* (2013.01); *B32B 37/12* (2013.01); *B32B 37/203* (2013.01); *B32B 38/0004* (2013.01); *B32B 2250/03* (2013.01); *B32B 2264/0207* (2013.01); *B32B 2264/0242* (2013.01); *B32B 2264/104* (2013.01); *B32B 2266/025* (2013.01); *B32B 2266/0221* (2013.01); *B32B 2266/0235* (2013.01); *B32B 2266/0278* (2013.01); *B32B 2307/102* (2013.01); *B32B 2307/406* (2013.01); *B32B 2307/412* (2013.01); *B32B 2307/50* (2013.01); *B32B 2307/554* (2013.01); *B32B 2307/56* (2013.01); *B32B 2307/58* (2013.01); *B32B 2307/718* (2013.01); *B32B 2307/732* (2013.01); *B32B 2309/02* (2013.01); *B32B 2309/105* (2013.01); *B32B 2419/00* (2013.01); *B32B 2419/04* (2013.01)

(56) References Cited

U.S. PATENT DOCUMENTS

| | | |
|---|---|---|
| 10,494,822 B2 | 12/2019 | Song |
| 2009/0031662 A1* | 2/2009 | Chen ............... E04F 15/02 52/515 |
| 2010/0055420 A1* | 3/2010 | Vermeulen ............... B32B 5/18 428/206 |
| 2011/0284131 A1 | 11/2011 | Trudel |
| 2012/0167522 A1 | 7/2012 | Pien |
| 2014/0109507 A1 | 4/2014 | Dossche et al. |
| 2015/0072102 A1 | 3/2015 | Dossche et al. |
| 2015/0151513 A1* | 6/2015 | Mizrahi ............... B32B 15/14 264/239 |
| 2015/0210055 A1* | 7/2015 | Pervan ............... C09D 11/322 524/388 |

\* cited by examiner

RIGID BOARD PLASTIC FLOORING AND ITS PRODUCTION METHOD

CROSS-REFERENCE TO RELATED APPLICATIONS

This Application is a Divisional of application Ser. No. 16/423,311 filed on May 28, 2019, which is a divisional of Ser. No. 15/013,461 filed on Feb. 2, 2016. Application Ser. No. 15/013,461 claims priority from Application 201510809064.0 filed on Nov. 20, 2015 in China.

FIELD OF THE INVENTION

The invention relates to a flooring product and the production method thereof, more specifically to a rigid board plastic flooring and the production method thereof.

BACKGROUND OF THE INVENTION

The floor-laying materials sold on the market so far mainly include ceramic tiles, wooden flooring, laminate flooring and PVC flooring. PVC flooring has been used in public and commercial places such as offices, schools, hospitals, pharmaceutical factories, sports arenas, entertainment facilities, shopping malls, restaurants and hotels, etc., as well as in the home because of its unique material, super performance, easy and fast installation, reasonable price and safety features.

The PVC flooring shall be prepared by using the following steps: 1) preparation of the intermediate substrate middle and back layer: mix PVC powder, plasticizer, the stabilizer and the filler according to the required order and proportion uniformly and roll to form PVC sheet; 2) Hot press: stick the wear layer, the print film, the middle layer and the back layer together by heating and pressurization after overlapping according to the required order; 3) coating and annealing: conduct UV treatment for the semi-finished product after hot press, making the PVC flooring more wearable, wherein the property of the semi-finished product after hot press is unstable, and the physical property after the heating treatment has excellent stability; 4) cutting: cut the PVC flooring into the product size required according to the order of the customer; and 5) beveling/profiling the click product: bevel/profile the click product according to the requirements of the customer and the appearance of PVC flooring will therefore be a resemblance of wood/stone flooring.

Plenty of plasticizer is required when preparing the in the calender process, however the plasticizer can permeate the PVC product because it is not tightly connected with the PVC product base. Research on animals indicated that the plasticizer might lead to a reduction in survival rate of the animal, weight loss, reduction of hepatorenal function, decrease of erythrocytes in the blood, possible mutation and cancer. Researchers also found after examining animals' embryotoxicity that the plasticizer might also cause some serious effects such as cleft palate, spinal deformity, cardiac deformation, defects of the eyes, malformation of fingers or toes, limb deformation, etc. of the animal fetus. The animal experiments conducted by the researchers indicated that this substance may affect the human hormonal system, especially in a growing adolescent; therefore, the European Union has listed it under harmful substances affecting reproduction. Moreover, the edge of the click product may be easily damaged during storage and transportation because the profile of click product is of poor strength.

SUMMARY OF THE INVENTION

The invention is designed to provide a rigid board plastic flooring and a production method of the flooring to offer a solution to the above-mentioned problems.

The technical solution offered is as follows:

The invention relates to a rigid board plastic flooring comprises a wear layer, a decoration layer, a first connecting layer and a bottom layer which are connected in the right order and stuck to each other by means of a hot press, wherein the bottom layer includes an extruded rigid board.

Preferably, the rigid board plastic flooring will comprise a further second connecting layer and a sound and shock-absorbing layer. The aforementioned second connecting layer and sound and shock-absorbing layer are arranged under the bottom layer in sequence.

Preferably, the first connecting layer and the second connecting layer are 0.01-0.5 mm thickness, and 5-300 g/m² in terms of gram weight.

Preferably, the first connecting layer and said second connecting layer are prepared from the same material; a membrane or cloth which is non-adhesive at room temperature and can stick the upper layer and the lower layer together when heated to 50-200° C.

Preferably, the aforementioned first connecting layer and the second connecting layer are prepared from different materials, more specifically, the first connecting layer is prepared from a non-adhesive membrane or cloth at room temperature and can stick the upper layer and the lower layer together when heated to 50-200° C.; the second connecting layer is prepared from a double-component adhesive.

Preferably, the bottom layer is ideally a plastic rigid board, such as PP, PE, PVC, PET, ABS, PC, POM, PMMA, PS, PEEK, PTFE, PVDF, etc.; the aforementioned sound and shock-absorbing layer is prepared from cork or foamed material of 0.1-5.0 mm thickness; the foamed material refers to a low-density foamed material.

Preferably, the aforementioned wear layer is prepared from transparent polymer material, such as PP, PE, PVC, PET, ABS, PC, POM, PMMA, PS, PEEK, PTFE, PVDF, etc.

Preferably, the decoration layer can be prepared from polymer materials, such as PP, PE, PVC, PET, ABS, PC, POM, PMMA, PS, PEEK, PTFE, PVDF, etc.

The invention also relates to a method of producing rigid board plastic flooring, wherein the bottom layer is moulded by way of the extruding process; a wear layer, a decoration layer, a first connecting layer and a bottom layer are subjected to hot press under a certain temperature and pressure;
  a. Hot press: Overlap a back embossment board, the bottom layer, first connecting layer, decoration layer, wear layer and the embossment board in sequence and implement hot press under a certain temperature and pressure;
  b. UV coating and annealing: Implement UV treatment to the surface of the semi-finished product after step a. The abrasion resistance is therefore increased, and the product has certain glossiness; then implement annealing to the product and cool it when the product is heated to a certain temperature. The product now has a nice physical property.
  c. Cutting: Cut to create product sizes required according to the needs of the customer.
  d. Trimming/beveling/profiling the click product: The appearance of the product will be a resemblance of wood/stone flooring by trimming/beveling/profiling the click product according to the requirements of the customer.

Preferably, said sound and shock-absorbing layer is connected to the bottom surface of the aforementioned bottom layer by using the second connecting layer after UV coating and annealing.

Preferably, the bottom layer will comprise PVC powder, a processing agent, internal lubricant, external lubricant, rare-earth stabilizer and calcium carbonate.

Preferably, the PVC powder, processing agent, internal lubricant, external lubricant, rare-earth stabilizer and calcium carbonate are 9.5-61.75%, 0-5.5%, 0.4-0.5%, 0.1-0.6%, 2.0-2.5% and 33.25-85.50% of the bottom layer respectively.

The product offers the following benefits:

The bottom layer of the flooring shall be prepared by using extrusion molding without adding plasticizer; therefore, the product is more environmentally friendly. The edge of the click product is not easily damaged during storage and transportation because the bottom layer includes a plastic hard board and the profile of click product has great strength.

BRIEF DESCRIPTION OF THE DRAWINGS

The particular features and advantages of the invention as well as other objects will become apparent from the following description taken in connection with the accompanying drawing in which.

DETAILED DESCRIPTION OF THE INVENTION

Figure 1:
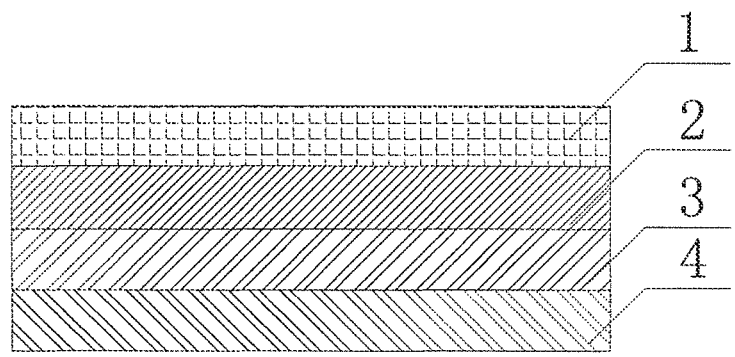
FIG. 1 is structure diagram of a first aspect of rigid board plastic flooring.

The following further explains the invention by combining the figures:

As shown in FIG. 1, the product comprises a wear layer 1, a decoration layer 2, a connecting layer 3 and a bottom layer 4, which are connected in sequence. The surface layer shall include a transparent wear layer of 0.1-1.0 mm thickness and can be prepared from transparent polymer materials such as PP, PE, PVC, PET, ABS, PC, POM, PMMA, PS, PEEK, PTFE, PVDF, etc. The second layer includes a decoration layer and this can be prepared from polymer materials such as PP, PE, PVC, PET, ABS, PC, POM, PMMA, PS, PEEK, PTFE, PVDF, etc. The third layer includes a connecting layer of 0.01-0.5 mm thickness and 5-300 g/m² in terms of gram weight and can be prepared from the membrane or cloth which is not adhesive at room temperature and can stick the upper layer and the lower layer together when heated to 50-200° C. Moreover, the fourth layer shall include a bottom layer of 2.0-10.0 mm thickness made from polymer hard board such as PP, PE, PVC, PET, ABS, PC, POM, PMMA, PS, PEEK, PTFE, PVDF, etc.

Figure 2:
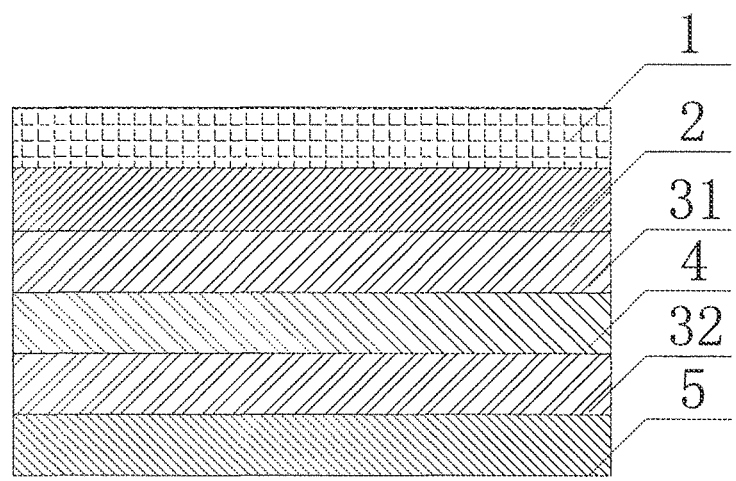
FIG. 2 is structure diagram of a second aspect of rigid board plastic flooring.

As shown in FIG. 2, the product comprises a wear layer 1, decoration layer 2, a first connecting layer 31, bottom layer 4, a second connecting layer 32 and a sound and shock-absorbing layer 5 which are connected in order. The surface layer includes a transparent wear layer of 0.1-1.0 mm thickness and can be prepared from transparent polymer materials such as PP, PE, PVC, PET, ABS, PC, POM, PMMA, PS, PEEK, PTFE, PVDF, etc. The second layer includes a decoration layer and can be prepared from polymer materials such as PP, PE, PVC, PET, ABS, PC, POM, PMMA, PS, PEEK, PTFE, PVDF, etc. The third layer includes a first connecting layer of 0.01-0.5 mm thickness and 5-300 g/m² in terms of gram weight and is prepared from membrane or cloth which is non-adhesive at room temperature and can stick the upper layer and the lower layer together when heated to 50-200° C. The fourth layer shall involve a bottom layer of 2.0-10.0 mm thickness and can be a polymer hard board, such as PP, PE, PVC, PET, ABS, PC, POM, PMMA, PS, PEEK, PTFE, PVDF, etc. The fifth layer involves a second connecting layer of 0.01-0.5 mm thickness and 5-300 g/m² in terms of gram weight and can be prepared from material identical to that of the first connecting layer, that is, membrane or cloth which is not adhesive at room temperature and can stick the upper layer and the lower layer together when heated to 50-200° C. Otherwise, it can be different from that of the first connecting layer, that is, double-component glue, such as epoxy resin adhesive, polyurethane adhesive and acrylate adhesive. Moreover, the sixth layer shall include a sound and shock-absorbing layer, which can be cork or foamed material. The foamed material will be a low-foamed material, which can be PE foamed material, EVA foamed material, EPDM foamed material, PP foamed material, PVC foamed material, PU foamed material, SBR foamed material or NBR foamed material of 0.1-5.0 mm thickness.

The invention also relates to a method of producing rigid board plastic flooring, wherein the bottom layer is molded by using the extruding process; the wear layer, decoration layer, first connecting layer and bottom layer shall be subjected to hot press under a certain temperature and pressure; the bottom layer comprises the PVC powder, processing agent, internal lubricant, external lubricant, the rare-earth stabilizer and the calcium carbonate with percentages of 9.5-61.75%, 0-5.5%, 0.4-0.5%, 0.1-0.6%, 2.0-2.5% and 33.25-85.50% respectively.

Figure 3:
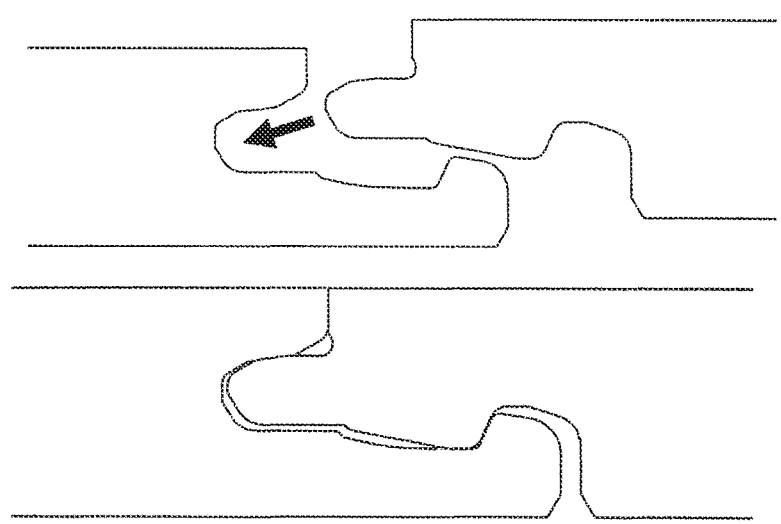
FIG. 3 is structure diagram of click profile.

1) As for structure of the first aspect, the production method is as follows:
   a. Hot press: Overlap a back embossment board, the bottom layer, the first connecting layer, the decoration layer, the wear layer and the embossment board in sequence and implement hot press under a certain temperature and pressure;
   b. UV coating and annealing: Implement UV treatment to the surface of the semifinished product which has already been stuck together, therefore increasing the abrasion resistance and the product then gains a certain glossiness. Then implement annealing to the product and cool it when the product has been heated to certain temperature, therefore the product has nice physical property.
   c. Cutting: Cut to size as required according to the needs of the customer.
   d. Trimming/beveling/profiling the click product (see FIG. 3): Make the appearance of the product to be a resemblance of wood/stone flooring by trimming/beveling/profiling the click product according to the requirements of the customer.

2) As for structure of the second aspect, the production method is as follows:
   a. Hot press: Overlap a back embossment board, the bottom layer, the first connecting layer, the decoration layer, the wear layer and the embossment board in the right order and implement hot press under a certain temperature and pressure;
   b. UV coating and annealing: Implement UV treatment to the surface of the semifinished product after step a, wherein the abrasion resistance is increased and the product has gained a certain glossiness. Then implement annealing to the product and cool it when the product is heated to certain temperature. The product therefore has a nice physical property.

c. Stick the sound and shock-absorbing layer to the bottom surface of the bottom layer by using the second connecting layer.

d. Cutting: Cut the product to size as required by the customer.

e. Trimming/beveling/profiling the click product (see FIG. 3): Make the appearance of the product to be a resemblance of wood/stone flooring by trimming/beveling/profiling the click product according to the requirements of the customer.

In conclusion, the bottom layer of the flooring product shall be prepared by using extrusion molding, without adding plasticizer. Therefore, the product is more environmentally friendly; the edge of the click product is not easily damaged during storage and transportation because the bottom layer includes a polymer hard board and the click product produced is strong.

The above-mentioned example is a better version of the product and does not limit the technical solution of the invention. Moreover, the technical solution which can be implemented on the basis of the above-mentioned description without creative additions shall be deemed as belonging to the protected scope of the utility model.

I claim:

1. A method of producing a rigid board plastic flooring comprising the steps of:
   extruding a bottom layer without adding a plasticizer;
   overlapping sequentially onto a back embossment board, the bottom layer, a first connecting layer, a decoration layer, and a wear layer to form a sandwich;
   hot pressing the sandwich with temperature and pressure;
   applying a UV treatment to a top surface of the sandwich after the hot pressing of the sandwich;
   annealing the sandwich after the applying of the UV treatment;
   cooling the sandwich to ambient temperature;
   adding a sound and shock absorbing layer to a bottom surface of the bottom layer of the sandwich; and
   cutting the sandwich to size.

2. The method of claim 1, further comprising:
   adding a second connecting layer before adding the sound and shock absorbing layer to the bottom layer of the sandwich between the cooling of the sandwich and the cutting of the sandwich.

3. The method of claim 1, wherein the bottom layer is formed from a PVC powder, a processing agent, an internal lubricant, an external lubricant, a rare-earth stabilizer and a calcium carbonate.

* * * * *

UNITED STATES PATENT AND TRADEMARK OFFICE
CERTIFICATE OF CORRECTION

| | |
|---|---|
| PATENT NO. | : 11,648,749 B2 |
| APPLICATION NO. | : 17/208192 |
| DATED | : May 16, 2023 |
| INVENTOR(S) | : Hsu-Ming Ting |

It is certified that error appears in the above-identified patent and that said Letters Patent is hereby corrected as shown below:

On the Title Page

Item [73], delete Assignee: "Danie" and insert --Darde--

Signed and Sealed this
Twenty-seventh Day of June, 2023

Katherine Kelly Vidal
*Director of the United States Patent and Trademark Office*